United States Patent
Nguyen et al.

(10) Patent No.: US 12,380,927 B2
(45) Date of Patent: Aug. 5, 2025

(54) SYSTEMS, METHODS AND GRAPHICAL USER INTERFACES FOR MEDIA CAPTURE AND EDITING APPLICATIONS

(71) Applicant: Apple Inc., Cupertino, CA (US)

(72) Inventors: Shem Nguyen, Oakland, CA (US); Soravis Prakkamakul, Mountain View, CA (US); Zachary Z. Becker, Kirkland, WA (US); Christopher I. Word, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 149 days.

(21) Appl. No.: 18/331,858

(22) Filed: Jun. 8, 2023

(65) Prior Publication Data
US 2023/0419998 A1    Dec. 28, 2023

Related U.S. Application Data

(60) Provisional application No. 63/367,183, filed on Jun. 28, 2022.

(51) Int. Cl.
| | |
|---|---|
| *G06F 3/04815* | (2022.01) |
| *G06F 3/0482* | (2013.01) |
| *G06T 15/20* | (2011.01) |
| *G06T 19/00* | (2011.01) |
| *G11B 27/036* | (2006.01) |
| *G11B 27/34* | (2006.01) |

(52) U.S. Cl.
CPC ........ *G11B 27/036* (2013.01); *G06F 3/04815* (2013.01); *G06F 3/0482* (2013.01); *G06T 15/20* (2013.01); *G06T 19/006* (2013.01); *G11B 27/34* (2013.01)

(58) Field of Classification Search
CPC ... G06F 3/14; G06F 3/16; G06F 15/00; G06F 15/16; G06F 15/173; G06F 17/00; G06F 3/00; G06F 3/041
See application file for complete search history.

(56) References Cited

U.S. PATENT DOCUMENTS

| | | | |
|---|---|---|---|
| 10,178,490 B1 * | 1/2019 | Sheaffer | G06T 7/20 |
| 2020/0286523 A1 * | 9/2020 | Wiklof | G11B 27/102 |

OTHER PUBLICATIONS

"Video Production Control Room for Live Television Productions", Sneaky Big Studios [online]. Retrieved from Internet Archive Wayback Machine <https://web.archive.org/web/20220808040651/https://sneakybig.com/facility/production-control/> on Apr. 26, 2024.

(Continued)

*Primary Examiner* — Rayeez R Chowdhury
(74) *Attorney, Agent, or Firm* — Kubota & Basol LLP

(57) ABSTRACT

Some examples of the disclosure are directed to media editing methods and graphical user interfaces. In some examples, the media editing user interface includes a plurality of user interface options and tools for capturing and editing media generated by a plurality of media recording devices. In some examples, states of the media recording devices are modified to add respective content to a media stream. In some examples, the media editing user interface includes representations of media content from the orientation of a respective media recording device. In some examples, the media editing user interface can present controls to alter contents of the media stream and publish and/or export the contents of the media stream.

24 Claims, 8 Drawing Sheets

(56) References Cited

OTHER PUBLICATIONS

Soper, Taylor, "Behind-the-scenes technology tour of ESPN's Monday Night Football production", GeekWire [online]. Nov. 17, 2016, [retrieved on Apr. 25, 2024]. Retrieved from the Internet: <URL: https://www.geekwire.com/2016/behind-scenes-technology-tour-espns-monday-night-football-production/>.

Extron, "Remote Control of Real Time Video Production Equipment", [retrieved on Apr. 25, 2024]. Retrieved from the Internet: <URL: https://www.extron.com/article/remotecontrol>.

Griffin, Ruairi, "6DIVE: 6 Degrees-of-Freedom Immersive Video Editor", Frontiers in Virtual Reality, vol. 2, Article 676895, Jun. 14, 2021, <DOI: 10.3389/frvir.2021.676895>, 16 pages.

* cited by examiner

800

```
┌─────────────────────────────────────────────────────────────┐
│ Presenting, via the display, the first peripheral device,   │
│ the second peripheral device, and a plurality of user       │ 802a
│ interface elements including a representation of a media    │
│ stream, a selectable user interface element corresponding   │
│ to the first peripheral device and a selectable user        │
│ interface element corresponding to the second peripheral    │
│ device                                                      │
└─────────────────────────────────────────────────────────────┘
                              ↓
┌─────────────────────────────────────────────────────────────┐
│ While presenting a plurality of user interface elements,    │ 802b
│ receive an input to initiate media capture                  │
└─────────────────────────────────────────────────────────────┘
                              ↓
┌─────────────────────────────────────────────────────────────┐
│ In response to the input to initiate media capture:         │ 802c
│  ┌───────────────────────────────────────────────────────┐  │
│  │ Initiate the media capture by a plurality of          │  │ 802d
│  │ peripheral devices                                    │  │
│  └───────────────────────────────────────────────────────┘  │
│                            ↓                                │
│  ┌───────────────────────────────────────────────────────┐  │
│  │ Add a first respective stream of the media capture    │  │ 802e
│  │ between a first time and a second time from the       │  │
│  │ first peripheral device in a first state to the       │  │
│  │ media stream                                          │  │
│  └───────────────────────────────────────────────────────┘  │
│                            ↓                                │
│  ┌───────────────────────────────────────────────────────┐  │
│  │ Display, via a display, a first visual indication     │  │ 802f
│  │ corresponding to the state of the first peripheral    │  │
│  │ device                                                │  │
│  └───────────────────────────────────────────────────────┘  │
└─────────────────────────────────────────────────────────────┘
                              ↓
┌─────────────────────────────────────────────────────────────┐
│ After initiating the media capture, receive an input        │ 802g
│ selecting the selectable user interface element             │
│ corresponding to the second peripheral device at the        │
│ second time                                                 │
└─────────────────────────────────────────────────────────────┘
                              ↓
┌─────────────────────────────────────────────────────────────┐
│ In response to the input selecting the selectable user      │ 802h
│ interface element corresponding to the second peripheral    │
│ device at the second time:                                  │
│  ┌───────────────────────────────────────────────────────┐  │
│  │ Transition the first visual indication to correspond  │  │ 802i
│  │ to a second state of the first peripheral device      │  │
│  └───────────────────────────────────────────────────────┘  │
│                            ↓                                │
│  ┌───────────────────────────────────────────────────────┐  │
│  │ Display, via the display, a second visual indication  │  │ 802j
│  │ corresponding to the first state of the second        │  │
│  │ peripheral device                                     │  │
│  └───────────────────────────────────────────────────────┘  │
│                            ↓                                │
│  ┌───────────────────────────────────────────────────────┐  │
│  │ Add a second respective stream of the media capture   │  │ 802k
│  │ between the second time and a third time from the     │  │
│  │ second peripheral device in the first state to the    │  │
│  │ media stream                                          │  │
│  └───────────────────────────────────────────────────────┘  │
└─────────────────────────────────────────────────────────────┘
```

FIG. 8

SYSTEMS, METHODS AND GRAPHICAL USER INTERFACES FOR MEDIA CAPTURE AND EDITING APPLICATIONS

CROSS-REFERENCE TO RELATED APPLICATIONS

This application claims the benefit of U.S. Provisional Application No. 63/367,183, filed Jun. 28, 2022, the content of which is incorporated herein by reference in its entirety for all purposes.

FIELD OF THE DISCLOSURE

This relates generally to systems, methods, graphical user interfaces for media capture and editing applications.

BACKGROUND OF THE DISCLOSURE

Media capture with multiple cameras is common to generate media content. However, improved tools for managing media capture and editing are desired to simplify the process and improve user experience.

SUMMARY OF THE DISCLOSURE

Some examples of the disclosure are directed to media editing methods and graphical user interfaces. In some examples, the media editing graphical user interface is configured to be displayed via a display or display generation component in communication with an electronic device. In some examples, the media editing user interface includes a plurality of user interface options and tools for capturing and editing media generated by a plurality of media recording devices. In some examples, the media editing user interface can represent a mixed reality environment including a real-world view seen by a user of the electronic device. In some examples, the real-world view can be observed directly through a visual passthrough and/or via one or more cameras included in the electronic device. In some examples, the media editing user interface can include one or more virtual controls associated with one or more peripheral devices in communication with the electronic device. In some examples, the media editing user interface includes representations of media based on media captured by the one or more peripheral devices. In some examples, the one or more virtual controls can initiate and terminate media capture by the electronic device and/or the one or more peripheral devices. In some examples, virtual controls associated with a respective peripheral device can provide indications of states of the respective device, and can transition or modify the state of the respective device. In some examples, the virtual controls include options to alter characteristics of media captured by a respective peripheral device. For example, a virtual control can be interacted with to alter a field of view and focus of a respective peripheral device. In some examples, the media capture and state transitions can be associated with time-based metadata. For example, the time-based metadata can include one or more time codes corresponding to a time of a state transition. In some examples, the peripheral device and/or the electronic device can include sensing circuitry to capture spatial data of a real-world environment. In some examples, state transitions can occur in response to explicit requests and/or automatically in response to detected events. In some examples, the electronic device can record additional media corresponding to previously captured time-based metadata. In some examples, the electronic device can display a preview of media captured by the electronic device and/or the peripheral devices based on the time-based metadata and state of the respective devices. In some examples, media editing, aggregation, and communication can be performed at a plurality of devices (e.g., including the electronic device). In some examples, virtual objects can be inserted into the mixed-reality environment using the virtual controls. In some examples, real-world objects can be removed from view, and the real-world environment corresponding to locations of the real-world objects can be interpolated using spatial data. In some examples, the media editing user interface can provide controls to initiate pairing and communications between the electronic device and the one or more peripheral devices. In some examples, the media editing user interface can include virtual controls for every peripheral device in communication with the electronic device. In some examples, elements of the media editing user interface can be emphasized or otherwise visually distinguished to indicate states and characteristics of the one or more peripheral devices. In some examples, the media editing user interface can present controls to alter contents of a media stream comprising media from the electronic device and/or the one or more peripheral devices using time-based metadata and publish and/or export the contents of the media stream.

The full descriptions of these examples are provided in the Drawings and the Detailed Description, and it is understood that the Summary presented herein does not limit the scope of the disclosure in any way.

BRIEF DESCRIPTION OF THE DRAWINGS

For improved understanding of the various examples described herein, reference should be made to the Detailed Description below along with the following drawings. Like reference numerals often refer to corresponding parts throughout the drawings.

FIG. 8 illustrates a flow diagram illustrating an example process for modifying a media stream according to some examples of the disclosure.

DETAILED DESCRIPTION

Figure 1:
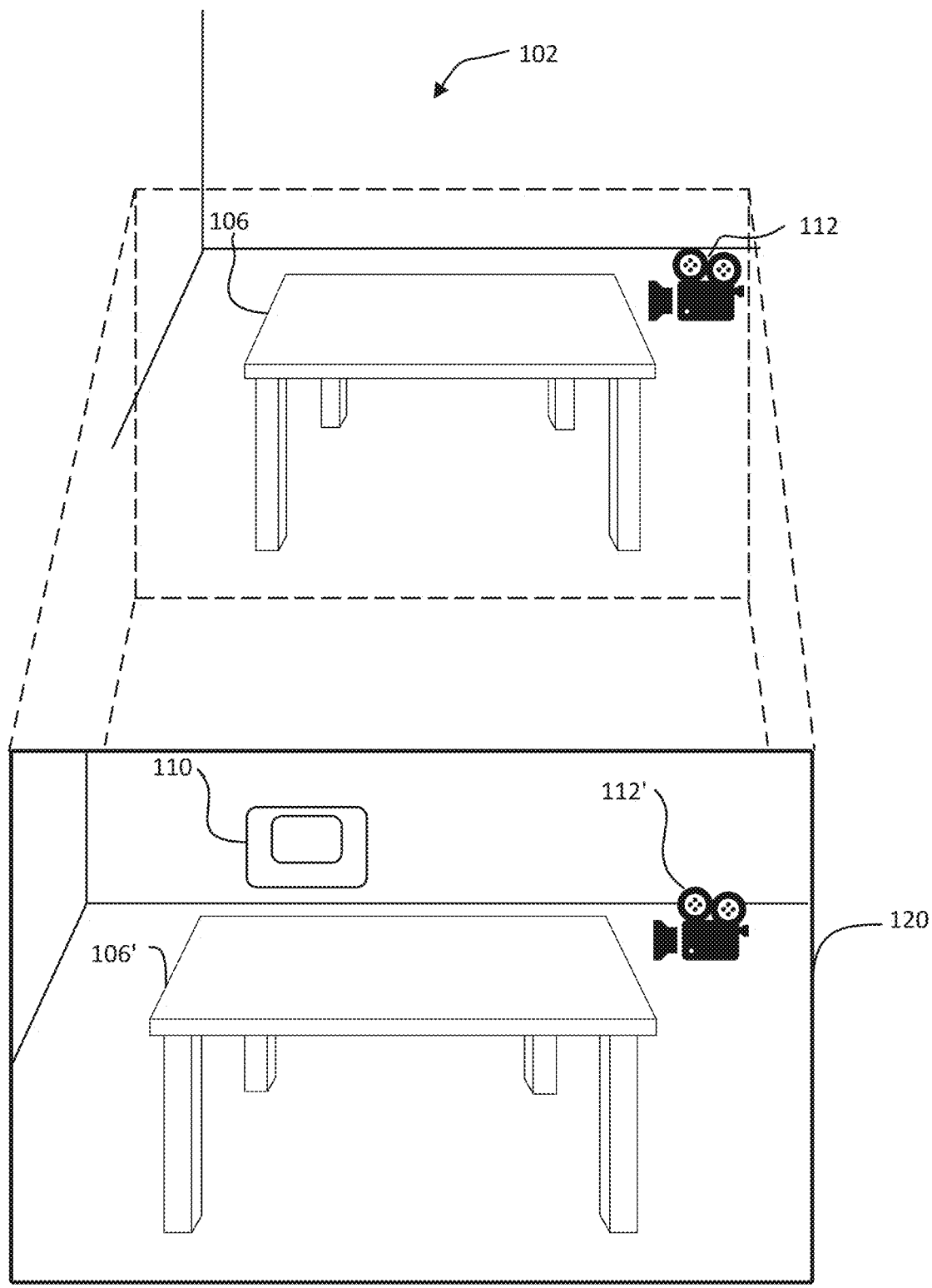
FIG. 1 illustrates an electronic device presenting an extended reality (XR) environment according to some examples of the disclosure

Some examples of the disclosure are directed to media editing methods and graphical user interfaces. In some examples, the media editing graphical user interface is configured to be displayed via a display or display generation component in communication with an electronic device. In some examples, the media editing user interface includes a plurality of user interface options and tools for capturing and editing media generated by a plurality of media recording devices. In some examples, the media editing user interface can represent a mixed reality environment including a real-world view seen by a user of the electronic device. In some examples, the real-world view can be observed directly through a visual passthrough and/or via one or more cameras included in the electronic device. In some examples, the media editing user interface can include one or more virtual controls associated with one or more peripheral devices in communication with the electronic device. In some examples, the media editing user interface includes representations of media based on media captured by the one or more peripheral devices. In some examples, the one or more virtual controls can initiate and terminate media capture by the electronic device and/or the one or more peripheral devices. In some examples, virtual controls associated with a respective peripheral device can provide indications of states of the respective device, and can transition or modify the state of the respective device. In some examples, the virtual controls include options to alter characteristics of media captured by a respective peripheral device. For example, a virtual control can be interacted with to alter a field of view and focus of a respective peripheral device. In some examples, the media capture and state transitions can be associated with time-based metadata. For example, the time-based metadata can include one or more time codes corresponding to a time of a state transition. In some examples, the peripheral device and/or the electronic device can include sensing circuitry to capture spatial data of a real-world environment. In some examples, state transitions can occur in response to explicit requests and/or automatically in response to detected events. In some examples, the electronic device can record additional media corresponding to previously captured time-based metadata. In some examples, the electronic device can display a preview of media captured by the electronic device and/or the peripheral devices based on the time-based metadata and state of the respective devices. In some examples, media editing, aggregation, and communication can be performed at a plurality of devices (e.g., including the electronic device). In some examples, virtual objects can be inserted into the mixed-reality environment using the virtual controls. In some examples, real-world objects can be removed from view, and the real-world environment corresponding to locations of the real-world objects can be interpolated using spatial data. In some examples, the media editing user interface can provide controls to initiate pairing and communications between the electronic device and the one or more peripheral devices. In some examples, the media editing user interface can include virtual controls for every peripheral device in communication with the electronic device. In some examples, elements of the media editing user interface can be emphasized or otherwise visually distinguished to indicate states and characteristics of the one or more peripheral devices. In some examples, the media editing user interface can present controls to alter contents of a media stream comprising media from the electronic device and/or the one or more peripheral devices using time-based metadata and publish and/or export the contents of the media stream.

FIG. 1 illustrates an electronic device 120 presenting an extended reality (XR) environment (e.g., a computer-generated environment) according to some examples of the disclosure. In some examples, electronic device 120 is a hand-held or mobile device, such as a tablet computer, laptop computer, smartphone, or head-mounted display. Examples of device 120 are described below with reference to the architecture block diagram of FIG. 2. As shown in FIG. 1, electronic device 120, table 106, and camera 112 are located in the physical environment 102. In some examples, electronic device 120 may be configured to capture images of physical environment 102 including table 106 and camera 112 (illustrated in the field of view of electronic device 120). In some examples, in response to a trigger, the electronic device 120 may be configured to display a virtual user interface 110 (e.g., two-dimensional virtual content) in the computer-generated environment that is not present in the physical environment 102, but is displayed in the computer-generated environment positioned on (e.g., anchored to) the top of a computer-generated representation 106' of real-world table 106. For example, virtual user interface 110 can be displayed on the surface of the computer-generated representation 106' of the displayed via device 120 in response to detecting the planar surface of table 106 in the physical environment 102.

It should be understood that virtual user interface 110 is a representative virtual object and one or more different virtual objects (e.g., of various dimensionality such as two-dimensional or three-dimensional virtual objects) can be included and rendered in a three-dimensional computer-generated environment. For example, the virtual object can represent an application or a user interface displayed in the computer-generated environment. In some examples, the virtual object can represent content corresponding to the application and/or displayed via the user interface in the computer-generated environment. In some examples, the virtual user interface 110 is optionally configured to be interactive and responsive to user input, such that a user may virtually touch, tap, move, rotate, or otherwise interact with, the virtual object. In some examples, the virtual user interface 110 may be displayed in a three-dimensional computer-generated environment within a multi-peripheral-device content creation application running on the electronic device 120. Additionally, it should be understood, that the 3D environment (or 3D virtual object) described herein may be a representation of a 3D environment (or three-dimensional virtual object) projected or presented at an electronic device.

In the discussion that follows, an electronic device that is in communication with a display generation component and one or more input devices is described. It should be understood that the electronic device optionally is in communication with one or more other physical user-interface devices, such as touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

Figure 2:
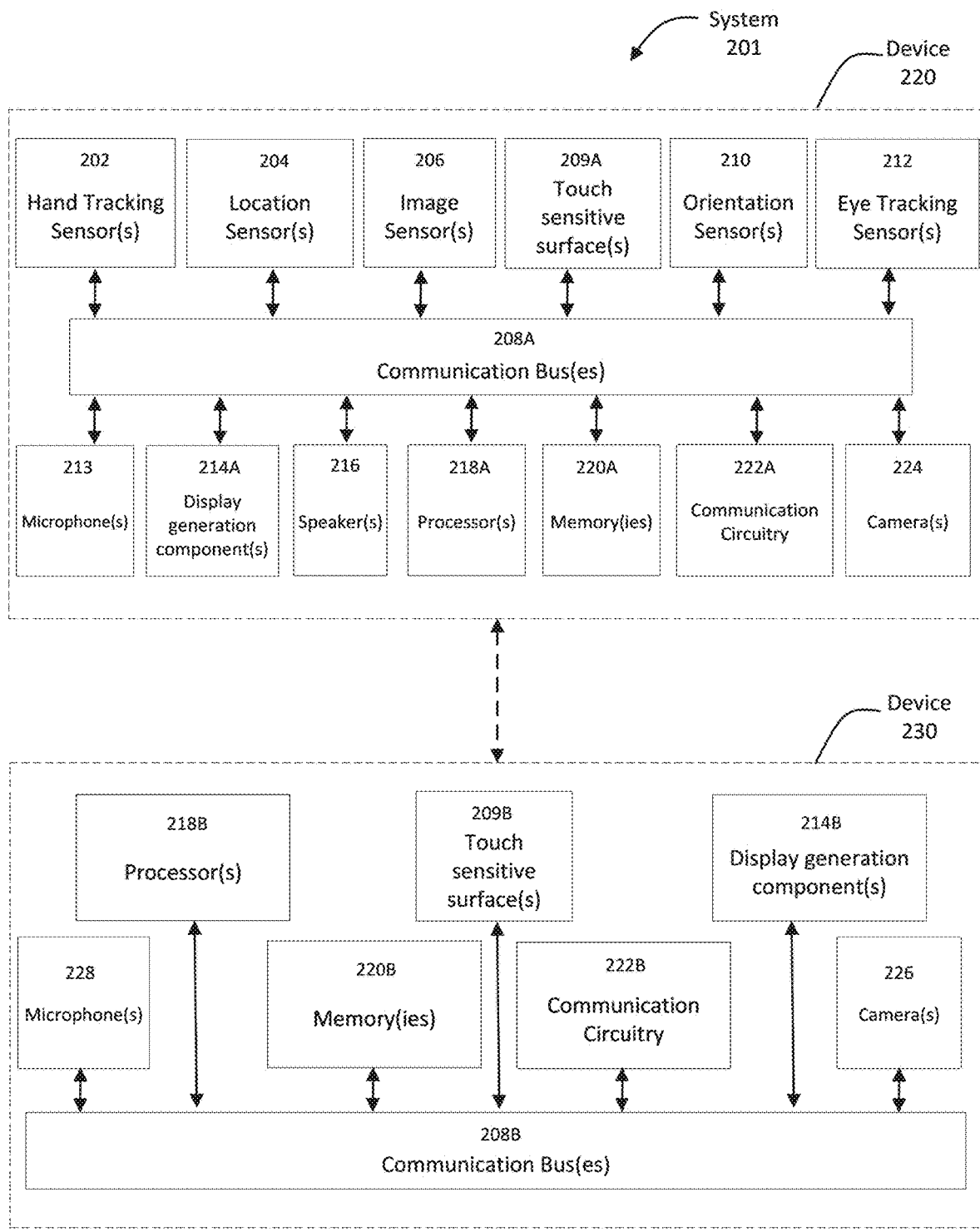
FIG. 2 illustrates a block diagram of an exemplary architecture for a system according to some examples of the disclosure.

FIG. 2 illustrates a block diagram of an exemplary architecture for a system 201 according to some examples of the disclosure. In some examples, system 201 includes multiple devices. For example, the system 201 includes a first electronic device 220 and a second electronic device 230, wherein the first electronic device 220 and the second electronic device 230 are in communication with each other. In some examples, the first electronic device 220 and/or the second electronic device 230 are a portable device, such as a mobile phone, smart phone, a tablet computer, a laptop computer, an auxiliary device in communication with another device, etc., respectively.

As illustrated in FIG. 2, the first device 220 optionally includes various sensors (e.g., one or more hand tracking sensor(s) 202, one or more location sensor(s) 204, one or more image sensor(s) 206, one or more touch-sensitive surface(s) 209A, one or more motion and/or orientation sensor(s) 210, one or more eye tracking sensor(s) 212, one or more microphone(s) 213 or other audio sensors, etc.), one or more display generation component(s) 214A, one or more speaker(s) 216, one or more processor(s) 218A, one or more memories 220A, and/or communication circuitry 222A. In some examples, the second device 230 optionally includes various sensors (e.g., one or more image sensor(s) such as camera(s) 226, one or more touch sensitive surface(s) 209B, and/or one or more microphones 228), one or more display generation component(s) 214B, one or more processor(s) 218B, one or more memories 220B, and/or communication circuitry 222B. One or more communication buses 208A and 208B are optionally used for communication between the above-mentioned components of devices 220 and 230, respectively. First device 220 and second device 230 optionally communicate via a wired or wireless connection (e.g., via communication circuitry 222A-222B) between the two devices.

Communication circuitry 222A, 222B optionally includes circuitry for communicating with electronic devices, networks, such as the Internet, intranets, a wired network and/or a wireless network, cellular networks, and wireless local area networks (LANs). Communication circuitry 222A, 222B optionally includes circuitry for communicating using near-field communication (NFC) and/or short-range communication, such as Bluetooth®.

Processor(s) 218A, 218B include one or more general processors, one or more graphics processors, and/or one or more digital signal processors. In some examples, memory 220A, 220B is a non-transitory computer-readable storage medium (e.g., flash memory, random access memory, or other volatile or non-volatile memory or storage) that stores computer-readable instructions configured to be executed by processor(s) 218A, 218B to perform the techniques, processes, and/or methods described below. In some examples, memory 220A, 220B can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

In some examples, display generation component(s) 214A, 214B include a single display (e.g., a liquid-crystal display (LCD), organic light-emitting diode (OLED), or other types of display). In some examples, display generation component(s) 214A, 214B includes multiple displays. In some examples, display generation component(s) 214A, 214B can include a display with touch capability (e.g., a touch screen), a projector, a holographic projector, a retinal projector, etc. In some examples, devices 220 and 230 include touch-sensitive surface(s) 209A and 209B, respectively, for receiving user inputs, such as tap inputs and swipe inputs or other gestures. In some examples, display generation component(s) 214A,214B and touch-sensitive surface(s) 209A, 209B form touch-sensitive display(s) (e.g., a touch screen integrated with devices 220 and 230, respectively, or external to devices 220 and 230, respectively, that is in communication with devices 220 and 230).

Devices 220 and/or 230 optionally includes image sensor(s). Image sensors(s) 206A optionally include one or more visible light image sensors, such as charged coupled device (CCD) sensors, and/or complementary metal-oxide-semiconductor (CMOS) sensors operable to obtain images of physical objects from the real-world environment. Image sensor(s) 206 also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206 also optionally include one or more cameras 224 configured to capture movement of physical objects in the real-world environment. Image sensor(s) 206 also optionally include one or more depth sensors configured to detect the distance of physical objects from device 220/230. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, devices 220 and/or 230 use CCD sensors, event cameras, and depth sensors in combination to detect the physical environment around devices 220 and/or 230. In some examples, image sensor(s) 206 include a first image sensor and a second image sensor. The first image sensor and the second image sensor work in tandem and are optionally configured to capture different information of physical objects in the real-world environment. In some examples, the first image sensor is a visible light image sensor and the second image sensor is a depth sensor. In some examples, device 220/230 uses image sensor(s) 206 to detect the position and orientation of device 220/230 and/or display generation component(s) 214A/214B in the real-world environment. For example, device 220/230 uses image sensor(s) 206 to track the position and orientation of display generation component(s) 214A/214B relative to one or more fixed objects in the real-world environment.

In some examples, device 220 includes microphone(s) 213 or other audio sensors. Device 220 uses microphone(s) 213 to detect sound from the user and/or the real-world environment of the user. In some examples, microphone(s) 213 includes an array of microphones (a plurality of microphones) that optionally operate in tandem, such as to identify ambient noise or to locate the source of sound in space of the real-world environment.

Device 220 includes location sensor(s) 204 for detecting a location of device 220 and/or display generation component(s) 214A. For example, location sensor(s) 204 can include a GPS receiver that receives data from one or more satellites and allows device 220 to determine the device's absolute position in the physical world.

Device 220 includes orientation sensor(s) 210 for detecting orientation and/or movement of device 220 and/or display generation component(s) 214A. For example, device 220 uses orientation sensor(s) 210 to track changes in the position and/or orientation of device 220 and/or display generation component(s) 214A, such as with respect to physical objects in the real-world environment. Orientation sensor(s) 210 optionally include one or more gyroscopes and/or one or more accelerometers.

Device 220 includes hand tracking sensor(s) 202 and/or eye tracking sensor(s) 212, in some examples. Hand tracking sensor(s) 202 are configured to track the position/location of one or more portions of the user's hands, and/or motions of one or more portions of the user's hands with respect to the extended reality environment, relative to the display generation component(s) 214A, and/or relative to another defined coordinate system. Eye tracking sensor(s) 212 are configured to track the position and movement of a user's gaze (eyes, face, or head, more generally) with respect to the real-world or extended reality environment and/or relative to the display generation component(s) 214A. In some examples, hand tracking sensor(s) 202 and/or eye tracking sensor(s) 212 are implemented together with the display generation component(s) 214A. In some examples, the hand tracking sensor(s) 202 and/or eye tracking sensor(s) 212 are implemented separate from the display generation component(s) 214A.

In some examples, the hand tracking sensor(s) 202 can use image sensor(s) 206 (e.g., one or more IR cameras, 3D cameras, depth cameras, etc.) that capture three-dimensional information from the real-world including one or more hands (e.g., of a human user). In some examples, the hands can be resolved with sufficient resolution to distinguish fingers and their respective positions. In some examples, one or more image sensor(s) 206 are positioned relative to the user to define a field of view of the image sensor(s) 206 and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures, touch, tap, etc.) can be advantageous in that it does not require the user to touch, hold or wear any sort of beacon, sensor, or other marker.

In some examples, eye tracking sensor(s) 212 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some examples, both eyes are tracked separately by respective eye tracking cameras and illumination sources, and a focus/gaze can be determined from tracking both eyes. In some examples, one eye (e.g., a dominant eye) is tracked by a respective eye tracking camera/illumination source(s).

Device 220/230 and system 201 are not limited to the components and configuration of FIG. 2, but can include fewer, other, or additional components in multiple configurations. In some examples, system 201 can be implemented in a single device. A person or persons using device 220/230 or system 201, is optionally referred to herein as a user or users of the device(s). Attention is now directed towards example graphical user interfaces for media capture and editing using media captured by an electronic device (e.g., corresponding to device 230) in a three-dimensional environment presented via a second electronic device (e.g., corresponding to device 220). As described herein, in some examples, the first electronic device may communicate with the second electronic device to coordinate media captured by the first and/or second electronic devices and edit the captured media. In some examples, the three-dimensional environment includes representations of the first and/or second electronic devices and can be interacted with to initiate, modify, and cease media captured by the first and/or second electronic devices. In some examples, the captured media can be edited and published to a media stream or file.

Figure 3:
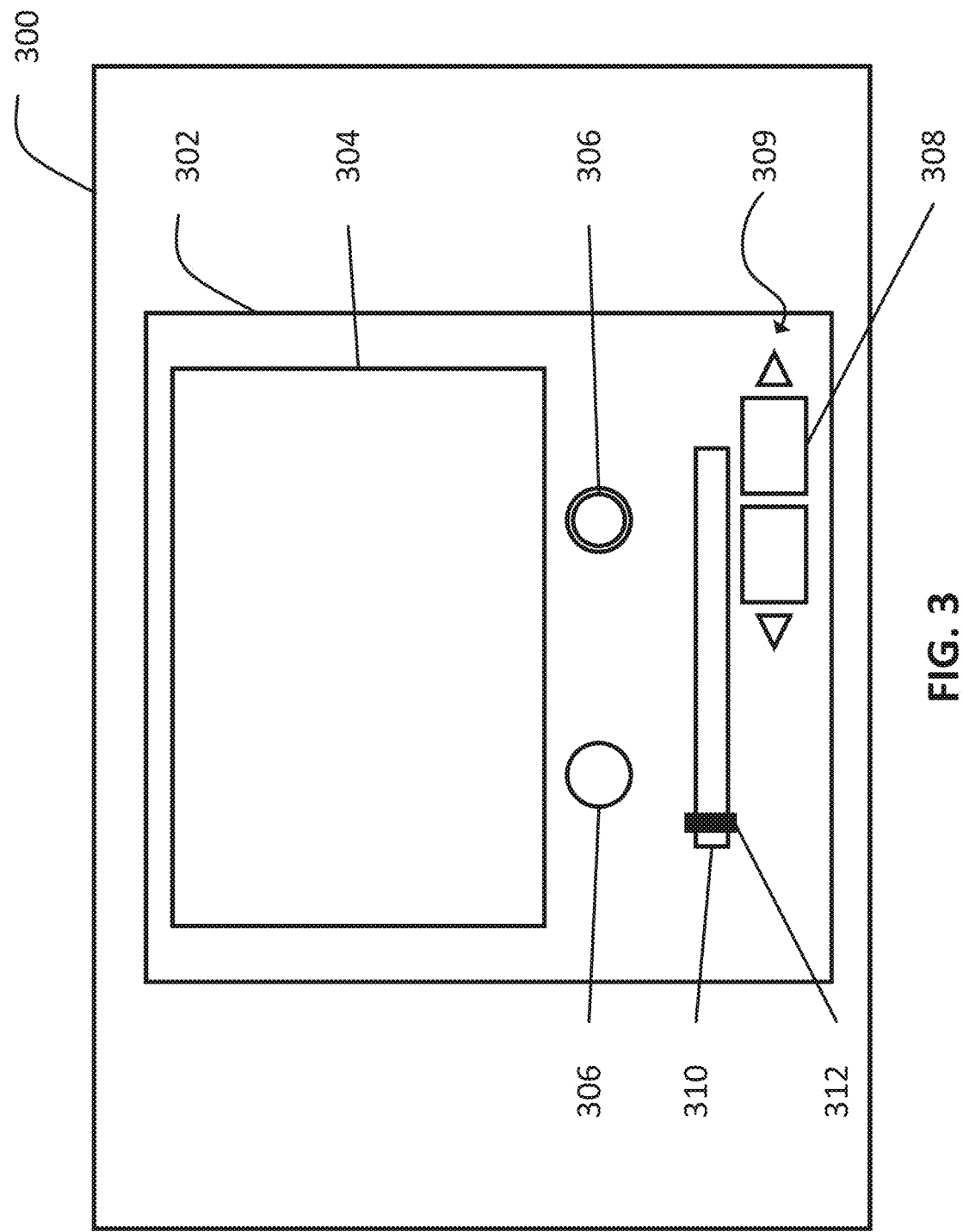
FIG. 3 illustrates an example media capture and editing user interface according to some examples of the disclosure.

FIG. 3 illustrates an example user interface 302 for media capture and editing user interface (also referred to herein as a media capture and editing user interface) according to some examples of the disclosure. In some examples, the user interface 302 can be displayed via an electronic device (e.g., device 220) having a display (e.g., display generation component(s) 214A) or in communication with a display. In some examples, the electronic device includes one or more media recording components (e.g., microphones, cameras, and/or other audio/visual sensing circuitry). In some examples, the electronic device is a mobile handset or tablet computer including one or more cameras, one or more microphones, and one or more displays. In some examples, the electronic device can be a head-mounted device including a viewfinder, a display, and/or one or more cameras. View 300 can correspond to an extended reality environment including a perspective captured using the electronic device (e.g., via one or more camera and/or a visual passthrough) and including user interface 302 with one or more user interface elements presented to a user of the device to control capture and editing of media. For example, user interface 302 can represent a virtual control panel presented along with other virtual or physical objects in view 300 (e.g., the perspective presented from a visual passthrough or corresponding to video captured by a camera of the electronic device). View 300 optionally corresponds to a three-dimensional environment that optionally includes real-world objects placed within a partial or completely virtual three-dimensional environment. User interface 302 optionally includes user interface controls for one or more peripheral devices. In some examples, the electronic device can communicate with one or more peripheral devices (e.g., corresponding to device 230) that optionally include media recording devices (e.g., cameras and/or microphones). User interface 302 optionally includes a preview user interface element 304 configurable to present an active preview of media captured by an active peripheral device of the one or more peripheral devices. As referred to herein, an active device can correspond to an electronic and/or peripheral device configured to publish media to a media stream. In some examples, the media stream can be associated with an editing decision list ("EDL"), wherein constituent portions of the media stream correspond to media captured by devices that are indicated (e.g., by the electronic device) as an active device. In some examples, a user of the electronic device can modify (e.g., edit) the media stream using media captured in accordance with interactions with user interface 302 as described herein. As described herein, in some examples, preview user interface element 304 can be configurable for playback of media captured by one or more peripheral devices.

In some examples, user interface 302 can include one or more user interface controls 306 to modify aspects of the media capture. For example, user interface controls 306 can include a user interface element (e.g., selectable user interface button) to capture a still image of the displayed user interface. In some examples, user interface controls 306 can include one or more user interface elements (e.g., selectable user interface button(s)) to initiate and/or terminate media capture by the peripheral devices. In addition, user interface 302 can include one or more user interface elements 308 corresponding to the respective peripheral devices. The user interface elements 308 can be presented as thumbnails with a representation of the audio and/or video recordings by the respective peripheral devices (e.g., similar to preview user interface element 304). In some examples, user interface elements 308 are selectable to cause the electronic device to transition a state of one or more of the peripheral devices. In some examples, navigation user interface controls 309 are provided to allow for navigation among the user interface elements 308, particularly when the number of peripheral devices exceeds the space provided in user interface 302 for displaying user interface elements 308.

In some examples, the visual perspective of the peripheral device capturing media displayed in preview user interface element 304 while recording can correspond to the field-of-view of the respective peripheral device in an active state. For example, the media captured by the respective peripheral device in the active state can have a first visual orientation corresponding to the field-of-view and orientation of the respective peripheral device, whereas a display of the electronic device can have a second, different visual orientation. For example, the electronic device optionally displays a visual passthrough using exterior cameras on the electronic device corresponding to what is visible via the electronic device (or the peripheral devices may be visible when the electronic device includes a transparent display). Yet, when displaying preview user interface element 304, the electronic device presents the media captured from the perspective of the first visual orientation, but reoriented for the orientation of the electronic device. For example, a respective peripheral device capturing video in a first room of a building can communicate a media stream directly, or through an intermediate device, to an electronic device in a second room. The electronic device optionally includes an active preview (e.g., preview user interface element 304) presenting the media stream from the respective peripheral device. Thus the media stream can provide a real-time (or nearly real-time, with less than a threshold delay (e.g., 1 second, 500 ms, 100 ms, or 50 ms)) view of the first room as captured by the peripheral device while a user of the electronic device is in the second room. In some examples, the respective peripheral device can also include a display (e.g., on an opposite side of the peripheral device from the camera). The media captured by the respective peripheral device in the active state can have the first visual orientation corresponding to the field-of-view and orientation of the respective peripheral device. However, the display of the preview user interface element 304 presented using the display of the electronic device with the second, different visual orientation can be presented at an offset from the first visual orientation.

In some examples, preview user interface element 304 can display media captured by one or more peripheral devices that the electronic device (e.g., the user of the electronic device) designates as active for purposes of publishing to a media stream. The publishing can include storing media captured by the peripheral device (e.g., using a database, server, or any other device including non-transitory computer readable storage medium). In some examples, in response to user input, the electronic device can transmit a command or otherwise initiate a process to initiate media capture (e.g., at one or more peripheral devices). In response to, or at a time after transmitting the command, the one or more peripheral devices optionally generate or initiate processes to generate time-based metadata associated with respective streams of media generated by the one or more peripheral devices (e.g., a first camera begins recording a first respective media stream, a second camera begins recording a second respective media stream). In some examples, the peripheral devices simultaneously record media, and the electronic device (or the user of the electronic device) optionally designates a publishing state of one or more of the devices. The publishing state optionally includes an active state, where time-based metadata optionally including time codes are used to associate media captured by a peripheral device operating in the active state is published to, or is designated to later publishing to, a media stream (e.g., a media file) to timing information of the media capture (e.g., when a peripheral device is active with respect to the initiation of media capture). The publishing state optionally includes an inactive state, in which media capture by the peripheral device continues, but without publishing the respective stream of the peripheral device to the media stream (e.g., raw media storage for later potential editing). In some examples, published media is associated with an EDL that is associated with the media stream. For example, the EDL can be associated with the status of a respective peripheral device using tagged metadata to describe the state and/or an indication of the duration of time elapsed in the state with respect to a media stream.

As described herein, user interface 302 optionally includes one or more user interface controls 306 and/or user interface elements 308 (e.g., thumbnails) corresponding to respective peripheral devices. For example, user interface elements 308 can correspond to static or dynamic thumbnail representations of video captured by respective peripheral devices (e.g., currently/in real-time, or including previously captured media). In some examples, user interface elements 308 can include a representation of audio (e.g., relative audio levels or an icon such as a microphone) to illustrate the function of the respective media source. In some examples, the user can select a respective user interface element of user interface elements 308, and in response to the selection, the electronic device can transition states of corresponding peripheral devices. For example, the peripheral device corresponding to the selected respective user interface element can be transitioned to an active state (e.g., from an inactive publishing state), and the peripheral device in the active state prior to the selection can be transitioned from the active state to an inactive state publishing state. As referred to herein, a state of a device (e.g., a peripheral device) can include aspects of the respective device including the power-state of a device, a function of the device (e.g., audio-only, video-only, or simultaneous audio and video recording), and/or the publishing state of the device. In some examples, media displayed within preview user interface element 304 can correspond to media that is concurrently displayed in a respective thumbnail. In some examples, selection of a respective thumbnail presents an enhanced (e.g., enlarged media, higher quality media, and/or louder or softer media) view of a corresponding peripheral device, optionally without changing the state of the corresponding peripheral device. In some examples, such a selection can present one or more selectable options to modify characteristics of content captured by the corresponding peripheral devices. The characteristics optionally include color modification, audio and/or video filters, and audio signal levels, but are understood to be not limited to such examples.

User interface 302 optionally includes a scrubber bar 310, which can illustrate progress of media capture over time (e.g., starting from the initiation of the media capture process). In some examples, scrubber bar 310 optionally includes information (e.g., events) based on the time-based metadata associated with the electronic device and one or more peripheral devices. For example, event indicator 312 can correspond to an instant in time during media capture corresponding to a request to change a state of a peripheral device (e.g., a transition of a first peripheral device from an inactive to an active publishing state and a transition of a second peripheral device from an active to an inactive publishing state). In some examples, event indicator 312 indicates a current progress of a media capture. Although one event indicator 312 is shown, it is understood that additional event indicators can be added in accordance with the changes in publishing state. In some examples, the event indicator 312 is displayed above or below scrubber bar 310 rather than overlapping scrubber bar 310. In some examples, during or after media capture is terminated, a user can select event indicator 312 (or another event indicator) to play back media captured by respective peripheral devices having the active state at the time corresponding to the event in the publishing or published media stream—or designated using time codes to correspond to such a time—indicated by event indicator 312. In some examples, the time-based metadata can include timing information generated by a device (e.g., the electronic device) communicating and/or tracking timing information at determined intervals (e.g., 1 ms, 5 ms, 10 ms, 50 ms, 100 ms, 500 ms, and/or 1 second). Such time-based metadata optionally is based on the communicated timing information (e.g., corresponding to a timestamp measured from an initiation of the media capture). In some examples, a communication source of the timing information can shared and/or handed off between multiple devices. In some examples, such time-based metadata can be communicated via a shared network (e.g., a shared musical instrument digital interface (MIDI) network interface). In some examples, a user can move an event indicator (e.g., using a select and drag input) to adjust the timing of a transition, as described in more detail herein.

Figure 4:
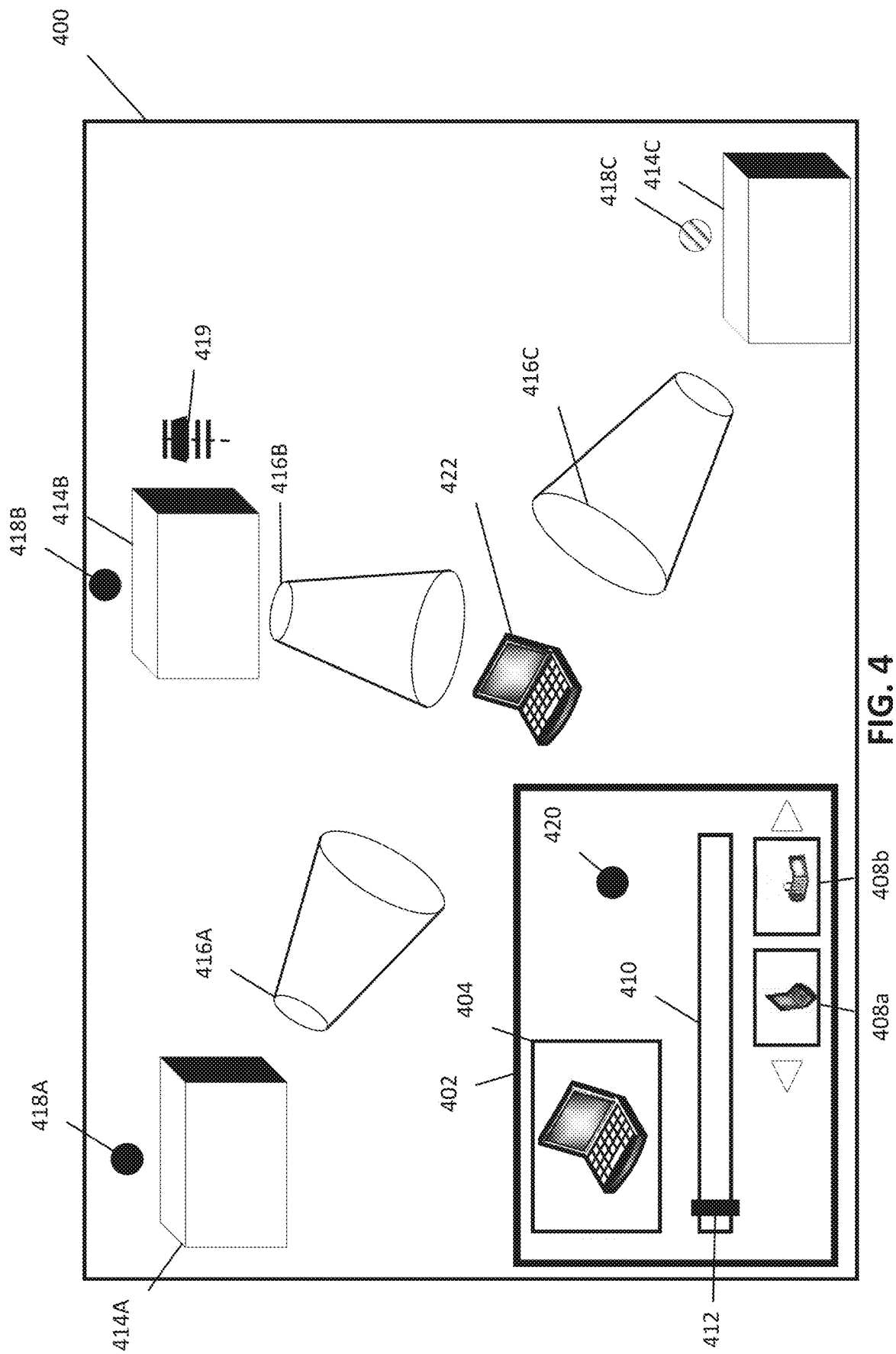
FIG. 4 illustrates an example media capture and editing user interface according to some examples of the disclosure.

FIG. 4 illustrates an example media capture and editing user interface according to some examples of the disclosure. As described with respect to FIG. 3, an electronic device can present view 400 including user interface 402 (e.g., corresponding to user interface 302) including multiple user interface elements. For example, user interface 402 illustrated in FIG. 4 includes preview user interface element 404 (e.g., corresponding to preview user interface element 304), scrubber bar 410 (e.g., corresponding to scrubber bar 310), and event indicator 412 (e.g., corresponding to event indicator 312). View 400 also shows peripheral devices 414A-414C presented to the user (e.g., visible to the user of system 201 or displayed by a display of system 201). Peripheral devices 414A-C can correspond to, for example, mobile devices, tablets, head-mounted devices, microphones, and/or cameras in communication with the electronic device (and/or in communication with an intermediary device coupled to the respective peripheral configured to facilitate exchange of media streams and/or accompanying time-based metadata). In some examples, the electronic device can receive time-based metadata based on regular time intervals and/or corresponding to specific events (e.g., transitions of peripheral devices between states). In some examples, time-based metadata is measured relative to an event, such as a selection of a user interface element 420 for initiating global recording (e.g., corresponding to one of the user interface controls 306).

In some examples, the electronic device and/or peripheral devices optionally include sensing circuitry to gather spatial data. For example, a respective peripheral device can include one or more light detection and ranging (LiDAR) sensors configured to collect spatial data. In some examples, the electronic device can be configured to receive the spatial data and present a map corresponding to the objects within and dimensions of a space, including representations of a respective peripheral device within the space. In some examples, the electronic device and/or the peripheral devices can be oriented towards the same object in space, and the electronic device can determine the positions of each peripheral device and the object in space using the spatial data and/or visual data (e.g., captured by image sensors included in respective devices). In some examples, the spatial data includes simultaneous localization and mapping (SLAM) data to construct the map, and respective positions of respective devices are determined and/or refined as visual data and/or other spatial data is collected, such as when a user directs a camera of a respective device around the scene. In some examples, the spatial data can be used by the electronic device to render a virtual object for display and to enable capture of the virtual object by the peripheral device (s) during media capture or to enable the rendering of the virtual object from the perspective of the peripheral device (s) during or after media capture. For example, a tablet computer device or a head-mounted device can have a visual passthrough including a virtual object positioned in proximity to and within the field of view of a respective peripheral device.

In some examples, view 400 can include one or more status indicators for respective peripheral devices. Status indicators 418A-418C illustrated in FIG. 4, for example, can be rendered in proximity to (e.g., within a threshold distance of) a respective peripheral device (e.g., peripheral devices 414A-C). In some examples, the status indicators are illustrated above the peripheral device. In some examples, the status indicators are displayed based on the field of view of the user. For example, status indicator 418B is shown above peripheral device 414B, but could instead be to the left or right or below peripheral device 414B when insufficient space is available in the field of view for display of the status indicator 418B above peripheral device 414B. In some examples, status indicators 418A-418C can indicate a state of respective peripheral device. For example, status indicator 418C can correspond to a publishing state of peripheral device 414C. As used herein, an active device can refer to an electronic and/or peripheral device configured in an active publishing state (e.g., an active device refers to more than recording state of the peripheral device).

Contents of a media stream captured by an active device optionally are reflected and/or represented in preview user interface element 404. In some examples, visual characteristics of preview user interface element 404 can be different relative to visual characteristics of representations of other peripheral device respective streams (e.g., preview user interface element enlarged relative to user interface elements 408A-B corresponding to the respective peripheral devices) to emphasize the active device. In some examples, the electronic device changes an appearance of a peripheral device and/or a representation of the peripheral device to emphasize the active device.

User interface elements 408A-B (e.g., thumbnails corresponding to user interface elements 308) can be presented to enable user selection of a different peripheral device. In some examples, the user interface elements 408A and 408B can include an indication of the state of the peripheral device corresponding to status indicator 418A and status indicator 418B, respectively. In some examples, the user interface elements 408A and 408B include representations of peripheral devices (e.g., an image of a camera, a phone, and/or a microphone). In some examples, the user interface elements 408A and 408B can include representations of media capture by the respective peripheral devices (e.g., still images, video stream, and/or visualization of audio characteristics).

In some examples, an appearance of each of the status indicators can transition from a first appearance to a second appearance in response to changes in state of a corresponding peripheral devices. The change in appearance can optionally include alterations in color, size, opacity, shape, and/or visibility of the status indicators.

In some examples, the user interface elements 408A-B (e.g., thumbnails) optionally are scrolled (e.g., in response to using gestures and/or selecting selectable options/user interface elements, such as navigation user interface controls 309) to browse the available peripherals devices. For example, each of the thumbnails can include real-time—or near real-time (e.g., with a threshold delay)—video captured by a respective peripheral device or pictures corresponding to recently captured video. In some examples, the orientation of each peripheral device 414A-C optionally is reflected in the thumbnails presented in user interface 402. For example, object 422 that is the subject of recording by peripheral device 414B as represented in thumbnail user interface element 408B corresponds to a top-down view as captured by peripheral device 414B. As described previously, selection of a respective thumbnail can optionally present one or more controls (e.g., within control panel 402 and/or in proximity to one or more peripheral devices).

In some examples, in addition to or as an alternative to presenting a status indicator for a respective peripheral device, other user interface elements can be presented for control of a respective peripheral device. For example, user interface element 419 corresponding to peripheral device 414B can be presented to the user, and user input to user interface element 419 (e.g., user interaction with user interface element 419) can be used to alter characteristics (e.g., frequency response, gain, preamplification, aperture, white-balance, and/or line level) of peripheral device 414B. Although not shown only for peripheral device 414B in FIG. 4, such user interface elements/controls can be presented in proximity to each, or some subset of, the peripheral device (e.g., peripheral devices 414A-C).

Additionally or alternatively, in some examples, a peripheral device can have a respective frustrum (e.g., frustrum 416A-C) presented to the user. The frustrum can be a user interface element that is optionally selectable to modify a field-of-view and/or focus of a respective peripheral device (e.g., peripheral device 414A-C). For example, frustrum user interface elements can include interactable handle(s) to change the orientation, aperture, and/or capture distance of the corresponding peripheral device.

In some examples, peripheral devices can transition publishing states automatically and/or in response to a manual request. In some examples, such automatic and/or manually requested state transitions can initiate a change of publishing state of one or more peripherals, a presentation of user interface elements 408A-B, and/or a presentation of active peripheral(s) in preview user interface element 404. In some examples, an operator of a peripheral device can trigger a request to transition states (e.g., by selecting a button on a respective peripheral device), and a visual indication of such a request optionally is displayed to user of the electronic device displaying user interface 402. For example, preview user interface element 404 can be updated in response to a request transition a state of a peripheral device, optionally with a representation of media captured by the peripheral device. In response to selection of the visual indication by the user of the electronic device or automatically (i.e., without selection of the visual indication by the user of the electronic device), the peripheral device that transmitted the request can transition between states (e.g., from an inactive publishing state to an active publishing state). In some examples, the response to such a request is not restricted to any particular function of a peripheral device, and can include a request to insert a virtual object into a scene and/or a request to make an adjustment to characteristic(s) of a peripheral device.

In some examples, publishing state transitions can happen automatically after determining the occurrence of one or more events, optionally using sensor data from peripheral devices. For example, one or more devices (e.g., peripheral devices and/or the electronic device in communication with the peripheral devices) can detect a threshold amount of movement (e.g., alterations to visual data captured by a peripheral device) and/or a threshold amount of sound (e.g., loud or sudden sounds), and automatically transition states in response to the detection.

In some examples, the peripheral devices can change state based on a time-based criteria. For example, after a threshold amount of time has elapsed from the selection of global recording option 420, one or more peripheral devices can automatically transition to an active publishing state. The time-based criteria optionally correspond to one or more events defined by a user of the electronic device tagged with time-based metadata (e.g., transition a device state at a particular point in time during media capture), such that when time-based metadata indicative of progress of a media stream is determined to match a respective event, one or more peripheral devices are transition device states.

In some examples, the electronic device and peripheral devices can publish respective media and time-based metadata to each other and/or other storage device (e.g., databases, servers, and/or computing workstations).

In some examples, after ceasing media capture via the electronic device, the electronic device can receive an indication of a selection input (e.g., of a time or window of time) along scrubber bar 410, and can receive inputs to initiate media capture by a peripheral device having time-based metadata associated with the selected time (or window). For example, a director of media may wish to record an additional take of video or audio collected beginning at the selected time (or within the window), optionally for use in a published media stream starting at the selected time (or within the window). The director optionally initiates recording of all devices (global recording) or using a respective peripheral device, and records additional media having time-based metadata (e.g., a timestamp) corresponding to the selected time (or window). After recording the additional media, the director can review contents of the published media stream and optionally insert the additional media and/or remove the original media corresponding to the selected time (or window).

In some examples, user interface element 420 is selectable to initiate a global recording. Such a selection can terminate or cease media capture by all—or some subset of—the peripheral devices. In response to the termination of media capture, media streams, references to media streams, and/or files can be transmitted to the electronic device. In some examples, a user of the electronic device can modify contents of the media stream by designating the status of a respective peripheral device. After aggregating media from the peripheral devices, the electronic devices can export and publish a media file comprising any edits made during the editing process. In some examples, editing, aggregating and exporting can be performed partially or entirely at another device (e.g., a hub device such as a workstation and/or servers) and the user interface presented by the electronic device can be used as an intermediary to provide controls during the editing and exporting process. In some examples, the electronic device can display a preview that optionally includes the entirety of the edited media stream, including indications of events corresponding to a transition between device state (e.g., active to inactive, or vice-versa) and virtual objects inserted into the edited media stream along an interactive timeline (e.g., a scrubber bar). The preview presented in preview user interface element 404 optionally includes varied media quality (e.g., lower or higher quality) based on user settings, device settings, and or network quality. For example, a user of the electronic device can desire a low latency video editing interface, and as such, the preview can be presented using a media stream comprising one or more pieces of content at a lower quality than a file generated at the conclusion of the video editing.

In some examples, a virtual environment based on spatial data collected by the electronic device and/or peripheral devices can be generated. The virtual environment can be viewed by a user of the electronic device and be rendered with representations of real-world objects detected by respective devices. In some examples, the virtual environment can be communicated using internet protocols (e.g., accessed via a web browser). The virtual environment optionally is hosted by a storage device (e.g., a server) or other computing device (e.g., a workstation or laptop computing device) in communication with the electronic device. In some examples, the electronic device can locally render a low-resolution representation of a virtual object, and the corresponding virtual environment can be updated to include a relatively higher-resolution representation of the same virtual object when viewed via a peripheral device in real-time (e.g., while capturing media and publishing to media stream). Properties and motion of the virtual object can be varied, also in real-time (e.g., a speed of an animation of the virtual object).

In some examples, the spatial data collected by the electronic device and peripheral devices can be used to remove real-world objects from a scene during media capture. For example, respective peripheral devices 414A-C can collect spatial data including data mapping the environment around—and dimensions of—object 422. The electronic device and/or an external computing device can use such spatial data to infer a predicted view of what each peripheral device would capture if object 422 were removed from the scene. Using the predicted view, the electronic device and/or the external computing device can interpolate elements of the space as if object 422 were absent from the scene, and publish such a predicted view to the media stream. Such an obstruction (e.g., object 422) does not necessarily need to be static—specifically, the peripheral devices or the obstruction can be moving, and the predicted view described herein can remove the obstruction. Thus, a user of the electronic device can optionally interpolate how a scene would look after removing obstructions (e.g., object 422) to reduce time and effort spent editing out such obstructions in post-production or removing the physical objects during media capture.

Figure 5:
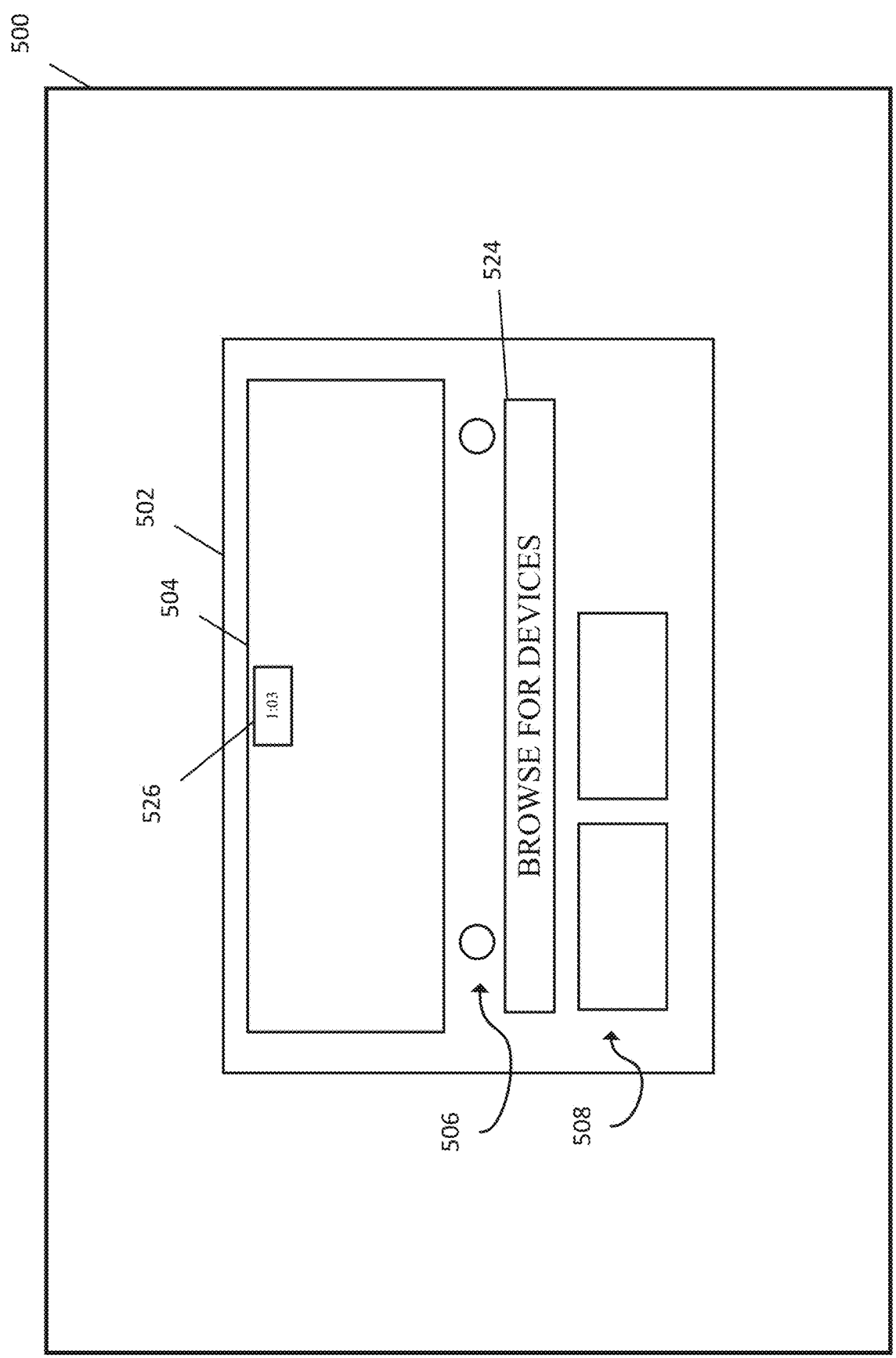
FIG. 5 illustrates an example media capture and editing user interface according to some examples of the disclosure.

FIG. 5 illustrates an example media capture and editing user interface according to some examples of the disclosure. As described with respect to FIGS. 3-4, view 500 of an electronic device can include user interface 502 (e.g., a control panel), preview user interface element 504, user interface control(s) 506, and user interface elements 508 corresponding to the respective peripheral devices (e.g., thumbnails). In some examples, user interface 502 includes one or more timestamps such as timestamp 526. For example, timestamp 526 can correspond to a current timestamp that indicates an amount of time that has elapsed since initiating media capture (e.g., by selecting a corresponding one of the one or more user interface controls 506). In some examples, the user interface can include a user interface element 524 that can be actuated to initiate a pairing operation between the electronic device and one or more peripheral devices. In some examples, a physical button included at the electronic and/or at a peripheral device can be actuated to initiate the pairing operation. For example, the pairing operation can include connecting to one or more peripheral devices in proximity or sharing a network (e.g., a wireless network) with the electronic device. In some examples, user interface element 524 is presented to the user in response to detecting a peripheral device using image sensors of the electronic device which are not already paired with the electronic device. As described herein, the peripheral devices that optionally pair to the electronic device can be configured to capture and stream media in real-time—or within a time threshold of real time—to the electronic device.

It is understood that the peripheral devices optionally include devices that store media for insertion into the captured media stream. For example, the devices can include digital audio workstations, optionally configured to receive media streams (e.g., from one or more other peripheral devices) and process the received media stream. The processing can include synthesizing and aggregating media streams to simulate the effect of a listener located amidst the peripheral devices (e.g., using spatial data), altering relative sound levels and other characteristics of individual audio streams, and aggregating multiple media streams into a single media stream that optionally is communicated to the electronic device. For example, the electronic device can receive or determine indications of movement of a real-world or virtual object (e.g., an audio source), and determine a corresponding change in a spatial relationship between the object and a respective peripheral device. In response to such indications, characteristics of an audio stream corresponding to the peripheral device can be modified (e.g., increased and/or decreased) to modify the auditory effect of such a change in the spatial relationship between the object and the respective peripheral device. For example, audio captured by a microphone as an ambulance drives by the microphone can be communicated (e.g., via an audio stream) to the electronic device. In response to determining the movement of the ambulance relative to the microphone, the audio captured by the microphone can be modified (e.g., the audio can be panned) in accordance with the movement.

Such modifications can include enhancing the Doppler effect of the audio captured by the microphone by modifying a pitch of the audio, raising or lowering the audio volume, and/or fading portions of the audio. In some examples, modifications to an audio stream corresponding to an audio source (e.g., a representation of an audio source visible in view 500) based on the spatial relationship between the audio source and the electronic device. In some examples, the electronic device can generate an aggregated audio stream including one or more respective audio stream from one or more respective devices, each respective audio stream optionally subject to modification of one or more auditory effects. In some examples, the modifications of auditory effect(s) occur in response to detecting an input to modify an active device at the electronic device. For example, a first camera in proximity to a real-world or virtual representation of an audio source can be in an active publishing state, and in response to detecting a selection of a second microphone, one or more audio streams can be modified (e.g., panned) based on the spatial relationship between the second microphone and the audio source rather than the spatial relationship between the first camera and the audio source. In some examples, the peripheral devices can be cameras, microphones, head-mounted electronic devices, and/or other suitable devices configured to capture and generate audio or video.

In some examples, pairing devices facilitates display and/or rending of virtual objects between devices as described with respect to FIG. 4. In some examples, pairing between devices is initiated in response to the selection of user interface element 524 (e.g., actuating a virtual button), optionally supplemented with or replaced by pairing that occurs in response to orienting a visual passthrough and/or camera(s) of the electronic device towards a peripheral device or a point in the space. In some examples, pairing between devices is initiated based on the orienting (e.g., detecting a gaze of a user of the electronic device). As described with respect to FIG. 4, in some examples, the pairing (e.g., gaze-based pairing) initiates an exchange of data between the electronic device and respective peripheral device(s) to synchronize an understanding of the space. Pairing devices optionally includes determining relative of locations of respective devices in the space using spatial data (e.g., using SLAM data). Additionally or alternatively, the electronic device optionally determines position and/or orientation of one or more peripheral device based on visual data collected by one or more cameras included at respective device(s), optionally by performing one or more mathematical transforms mapping the visual data to a map of the space including the electronic and peripheral devices. In some examples, an environment including the map and the relative locations of the electronic and peripheral devices are shared between the devices during one or more communication sessions. In some examples, a virtual object is rendered at a point in the space such that when a respective device is directed to the point in the space (e.g., a camera or visual passthrough is oriented towards the point in space), the virtual object is visible. In some examples, the virtual object has also has a first orientation within the space, as if it was a static, real-world object placed in the space. Accordingly, in some examples, the electronic device receives media stream(s) including media captured from the perspective (e.g., from the respective orientation and/or viewpoint) of the respective peripheral device, including the virtual object that has the first orientation relative to the space.

Figure 6:
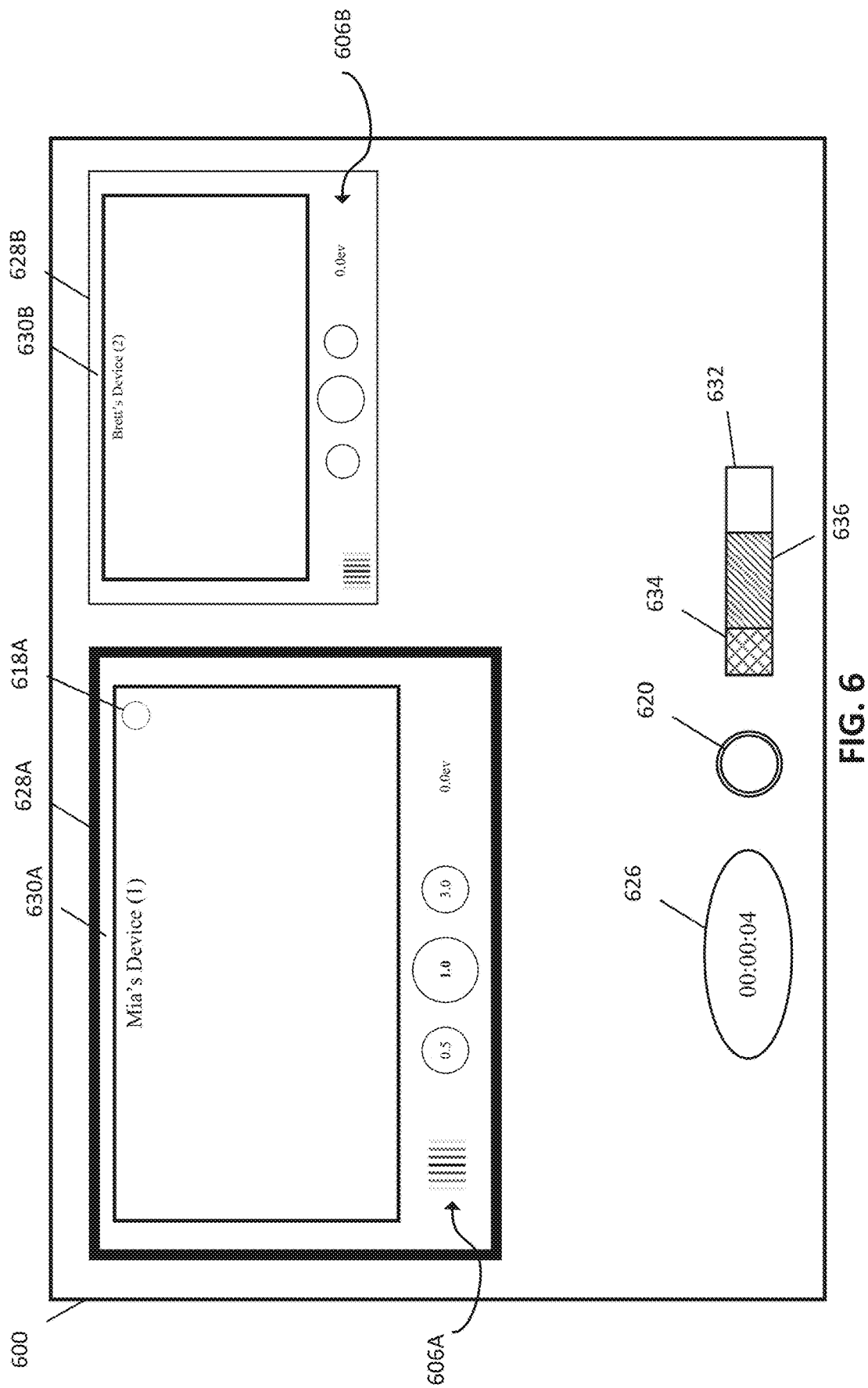
FIG. 6 illustrates an example media capture and editing user interface according to some examples of the disclosure.

FIG. 6 illustrates an example media capture and editing user interface according to some examples of the disclosure.

View 600 includes user interface elements of a media capture and editing user interface. In some examples, the user interface element includes a control panel user interface for each or a subset of one or more peripheral devices in communication with the electronic device (e.g., control panel 628A corresponding to a first peripheral device and control panel 628B corresponding to a second peripheral device). Although not shown, view 600 may also include the peripheral devices and the control panel user interfaces can be displayed in proximity (e.g., within a threshold distance, closer to the corresponding peripheral device than any other peripheral device) to the corresponding peripheral devices. In some examples, the user interface elements include user interface controls and information related to media capture. For example, similar to the description with respect to FIGS. 3-5, a user interface element 620 for initiating global recording can be presented and selected to initiate media capture by the electronic device and the one or more peripheral devices. Additionally or alternatively, timestamp 626 user interface element can indicate an amount of time elapsed from the initiation of media capture.

In some examples, each control panel user interface includes controls for the corresponding respective peripheral device. For example, control panel 628A includes one or more user interface controls 606A. The one or more user interface controls can include one or more user interface elements (buttons, sliders, etc.) available to a user to change characteristics of a corresponding peripheral device (shutter speed, white balance, framerate, zooming operations, color filters, etc.). Control panel 628B can include user interface controls 606B that are similar to (or the same as) user interface controls 606A. In some examples, control panel 628A can have an appearance to indicate to a user of a state of the peripheral device, and which can be modified to indicate a change in state of the peripheral device. For example, a user interface element (e.g., icon 618A) can indicate to the user that the corresponding peripheral device is in an active publishing state. Additionally or alternatively, the border of control panel 628A can be emphasized (e.g., with scale, color, thickness and/or opacity) to indicate the corresponding peripheral device is in an active publishing state. Additionally or alternatively, the relatively larger size of control panel 628A compared with control panel 628B can indicate the peripheral device corresponding to control panel 628A is in an active publishing state (and the peripheral device corresponding to control panel 628B is in an inactive publishing state). In some examples, each control panel 628A and 628B can present a preview of media captured by respective devices, as described previously with respect to FIGS. 3-5 and omitted herein for brevity. In some examples, control panel 628A and the user interface elements within the control panel in the active state can be enlarged (or additional user interface elements or expanded user interface elements can be presented within control panel 628A compared with those presented in control panel 628B). In some examples, a preview user interface element (e.g., corresponding to preview user interface element 304, 404, 504) can be included. In some such examples, control panels 628A-628B can be presented as shown in FIG. 6 rather than showing the preview of the respective peripheral device as a thumbnail (e.g., as shown by user interface elements 308 corresponding to the respective peripheral devices).

As described with respect to FIGS. 4-5, time-based metadata indicative of the state of the peripheral devices can be generated, received, stored, and/or accessed by the electronic device. In some examples, a user interface element is displayed in view 600 graphically illustrating the state information represented by the time-based metadata. For example, the user interface element can include rough cut bar 632. In some examples, rough cut bar 632 can represent a relative timeline (e.g., scrubber bar 310 and scrubber bar 410) of media captured by devices in communication with the electronic device. The rough cut bar 632 can include different segments (segments 634, 636, etc.) representative of corresponding periods in which a respective peripheral device is in the active publishing state. In some examples, the width of a segment can represent the duration in which a respective peripheral device is in the active publishing state. In some examples, each segment corresponding to a respective peripheral device represented in rough cut bar 632 can be visually distinguished (e.g., with a fill color, pattern, border, text label, and/or scale) from other segments corresponding to different respective peripheral devices, to indicate a source of media (e.g., the corresponding peripheral device in the active publishing state). For example, the segments in rough cut bar 632 can include color corresponding to the peripheral device in an active state during a given time segment (e.g., each peripheral device can be assigned a color). In some examples, the color corresponding to a respective peripheral device in the rough cut bar 632 can also reflect the same color as presented for the control panel user interface for the respective peripheral device. In some examples, segment 634 can correspond to a time period in which a peripheral device corresponding to control panel 628B (e.g., "Brett's Device (2)" as designated by label 630B) is in an active state and a peripheral device corresponding to control panel 628A (e.g., "Mia's Device (1)" as designated by label 630A) is in the inactive state. Similarly, segment 636 can correspond to a time period in which a peripheral device corresponding to control panel 628A (e.g., "Mia's Device (1)" as designated by label 630A) is in the active state and a peripheral device corresponding to control pane 628B (e.g., "Brett's Device (2)" as designated by label 630B) is in the inactive state. The time-based metadata optionally includes information to render segments 634 and 636 with visual distinctions corresponding to media sources based on time of initiation of media capture (e.g., by the electronic device using a selectable option or other appropriate gesture or input). As described previously, the input to initiate media capture can be received at the electronic device (e.g., a gesture or selection of an element presented by the electronic device) and/or at another device (e.g., a hub device in communication with the electronic device).

Figure 7:
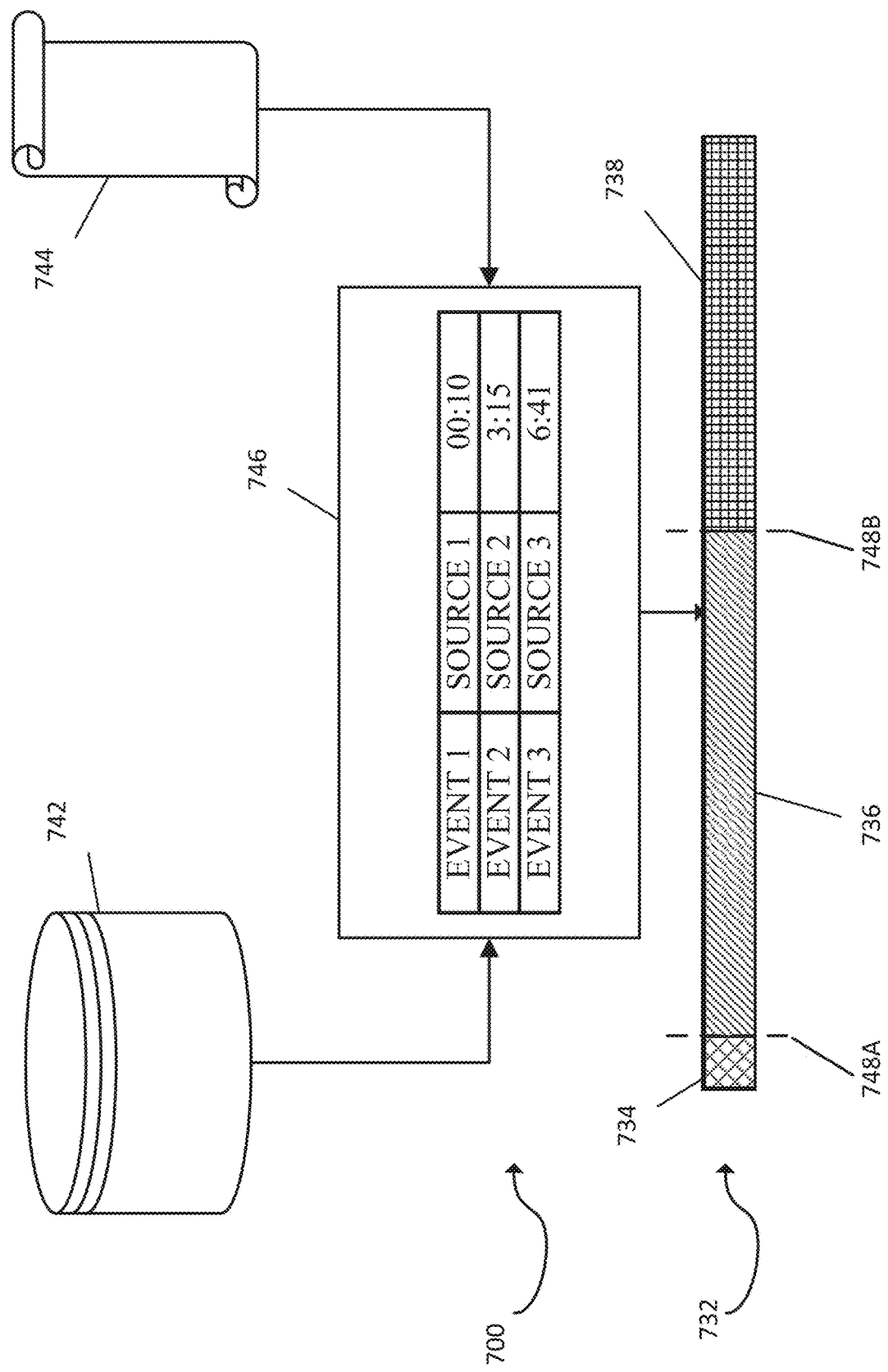
FIG. 7 illustrates an example process of media capture and editing according to some examples of the disclosure.

FIG. 7 illustrates an example process of media capture and editing according to some examples of the disclosure. In some examples, during or after terminating media capture by one or more devices, a respective media stream optionally from a respective peripheral or electronic device can be received and stored at storage device 742 (e.g., memory 220A and/or memory 220B). For example, a first respective media stream is optionally received from a first respective peripheral device, a second respective media stream is optionally received from a second respective peripheral device, and so on for each peripheral device. It is understood that storage device 742 is represented as a singular device, however, data storage optionally is distributed between a plurality of storage devices (not shown). Similarly, it is understood that description related to generation, communication, reception, aggregation of, and functions using time-based metadata can be performed at a device (e.g., an electronic device or peripheral device) or distributed across a plurality of devices (e.g., an electronic device in communication with a hub device and/or a server).

In some examples, an event log 744 can be generated during recording, concurrently with, or after terminating the media capture. The event log 744 optionally includes time-based metadata and indications of sources of respective media streams and can be understood as an editing decision list (EDL). For example, the event log 744 optionally includes metadata identifying a transition of an identified peripheral device from a first state to a second state and one or more times when such a transition occurs, such as a timecode/timestamp. Although not shown, event log 744 can be stored in the storage device 742, or in the same plurality of storage devices, locally on a device (e.g., the electronic device or a hub device), or distributed across multiple devices. Event log 744 optionally is used to obtain media from storage device 742 (e.g., by the electronic device) and generate a rough cut 746. In some examples, while a user of the electronic device is editing the event log, uncompressed media captured by respective one or more peripheral devices can be stored at the respective one or more peripheral devices and communicated to the electronic device with a relatively lower data quality. For example, during an editing process, the electronic device can receive a compressed version of the media (e.g., a compressed media stream) while an uncompressed version of the media remains in memory at a peripheral device. In some examples, after finalizing the editing process at the electronic device, the uncompressed media is communicated to the electronic device from the one or more peripheral devices, and the electronic device can publish a media stream (e.g., a file) in accordance with the edited event log using the uncompressed media. For example, in response to receiving a request at the electronic device to publish the media stream such as selection of a physical button or a virtual button displayed in a user interface, the electronic device can receive uncompressed media (e.g., a raw video file or stream) from the peripheral devices. In some examples, portions of uncompressed media corresponding to the contents of the event log are communicated to the electronic device, and portions of the uncompressed media not corresponding to the contents of the event log are not communicated to the electronic device. For example, uncompressed media corresponding to segment 734 from "source 1" as shown in FIG. 7 can be communicated to the electronic device, while uncompressed media corresponding to segment 736 and segment 738 are not communicated to the electronic device in response to a request to publish a media stream corresponding to timeline 732. In some examples, another device (e.g., a computing workstation) can share responsibility, or be solely responsible for receiving the compressed data streams and/or publishing the media stream corresponding to timeline 732. Thus, because less data is communicated when compressed media is sent to the electronic device (e.g., during the editing process), network and processing latency can be reduced while editing the event log.

In response to a request (e.g., by the electronic device, or via a hub device in communication with the electronic device), portions of respective media streams generated by respective peripheral devices and corresponding to events in the event log (e.g., events where the respective peripheral device is in an active state between timestamps included in the time-based metadata) can be published to an aggregated media stream that is served to a client device (e.g., the electronic device). In some examples, event log 744 optionally identifies one or more active peripheral devices during a given time period. In some examples, two or more media streams can be combined (e.g., by the electronic device and/or a hub device in communication with the electronic device) or communicated simultaneously to the client device. As described previously, the event log 744 can be used to render a timeline 732 (e.g., scrubber bar 310 and scrubber bar 410) including visually distinguished portions (e.g., segments, 734, 736, and 738) having characteristics corresponding to a media source. For example, "Event 1" as illustrated in rough cut 746 can correspond to a transition from a first media source (e.g., "Source 1") to another media source (e.g., "Source 2") 10 seconds after initiation of media capture. Segment 734 reflects a visually distinguished portion of timeline 732 in which a first media stream received from a first peripheral device is used/retrieved (e.g., for display via a display in communication with the electronic device). Similarly, "Event 2" and "Event 3" as illustrated in rough cut 746 can correspond to transitions (e.g., from an active to an inactive state) of a second and a third source of media, respectively. Accordingly, segments 736 and 738 can correspond to "Event 2" and "Event 3," respectively. Although not shown, the time-based metadata can include a start and an end time of time periods corresponding to events (e.g., a time of the beginning and end of the event).

In some examples, in response to user input (e.g., via the electronic device), the electronic device or a hub device optionally modifies event log 744 and/or adds media to storage device 742. For example, while reviewing a playback of a media stream in accordance with rough cut 746, the electronic device optionally receives one or more inputs corresponding to a request to replace, append, supplement, or otherwise alter contents of event log 744. Such alterations can, for example, correspond to an addition of a media stream between events. In some examples, the alterations include changing an event from a first time to a second time to prolong display of a first media stream from a first peripheral device (e.g., a first camera) and delaying the display of a second media stream from a second peripheral device (e.g., a second camera).

In some examples, timeline 732 includes selectable options (e.g., user interface elements) to modify the time periods corresponding to events. In some examples, a user of the electronic device can select option 748A and modify (e.g., increase or decrease) aspects of time-based metadata associated with "Event 1" and "Event 2" in response to modifying a position of option 748A (e.g., detecting movement of an indication of selection of option 748A while maintaining the selection by a cursor, input device, or hand of the user). For example, in response to selection and modification of option 748A corresponding to a request to delay Event 1, the electronic device can initiate a process to delay the transition corresponding to Event 1 (e.g., transitioning from source 1 to source 2 at 12 seconds, instead of 10 seconds). Although not shown, a user of the electronic device can modify the event log 744 in response to selecting and inserting media sources. For example, while displaying timeline 732 (e.g., scrubber bar 310 and 410), the electronic device can detect a selection of a media source (e.g., a representation of a media source) and can detect a request to insert the media source at a particular segment of the timeline (e.g., a selection, drag, and drop of a representation of a peripheral device on to segment 734, segment 736, and/or segment 738). In some examples, the electronic device can replace a first media source with a second media source in response to detecting the insertion. In some examples, electronic device can supplement a first media source with a second media source in response to detecting the insertion.

FIG. 8 illustrates a flow diagram illustrating an example process for modifying a media stream according to some examples of the disclosure. In some examples, process 800 begins at an electronic device in communication with a display and a plurality of peripheral devices configured to capture media, the plurality of peripheral devices including a first peripheral device and a second peripheral device. In some examples, the electronic device is optionally a desktop computer, a laptop computer, or a tablet computer, similar or corresponding to electronic device 230 of FIG. 2. As shown in FIG. 8, in some examples, at 802a, the electronic device may present, via the display, a plurality of user interface elements including a representation of a media stream, a selectable user interface element corresponding to the first peripheral device and a selectable user interface element corresponding to the second peripheral device. For example, a respective selectable option corresponding to a respective peripheral device 414A and a user interface control included in user interface controls 606A and user interface controls 606B as shown in FIG. 6.

In some examples, at 802b, while presenting the plurality of user interface elements, the electronic device may receive an input to initiate media capture. For example, as described with respect to FIG. 3, the electronic device may detect selection of a user interface control included in user interface controls 306, and as described with respect to selection of user interface element 420, the electronic device may initiate recording at one or more peripheral devices in response to detecting selection of user interface element 420.

In some examples, at 802c, in response to the input to initiate media capture, the electronic device may initiate the media capture by the plurality of peripheral devices, at 802d, add a first respective stream of the media capture between a first time and a second time from the first peripheral device in a first state to the media stream, at 802e, and display, via the display, a first visual indication corresponding to the first state of the first peripheral device, at 802f. For example, as described with respect to FIG. 4, the electronic devices optionally modifies a state of a peripheral device (e.g., to an active publishing state) and modifies the appearance of status indicator 418A and/or status indicator 418B to reflect the state (e.g., the publishing state) of the peripheral device.

In some examples, at 802g, after initiating the media capture, receive an input selecting the selectable user interface element corresponding to the second peripheral device at the second time. For example, as described with respect to FIG. 4, the electronic device optionally detects an input selecting a user interface element (e.g., a virtual button corresponding to peripheral device 414A, peripheral device 414B, and/or peripheral device 414C).

In some examples, at 802h, in response to the input selecting the selectable user interface element corresponding to the second peripheral device, at 802g, the electronic device may transition the first visual indication to correspond to a second state of the first peripheral device, at 802i. For example, as described with respect to FIG. 4, a respective status indicator (e.g., status indicator 418A, status indicator 418B, status indicator 418C) may modify appearance in accordance with a transition and/or modification of device state (e.g., from an inactive to an active publishing state, or vice-versa). In some examples, at 802j, the electronic device displays, via the display, a second visual indication corresponding to the first state of the second peripheral device, as described with respect to FIG. 4.

Therefore, according to the above, some examples of the disclosure are directed to an electronic device in communication with a display and a plurality of peripheral devices configured to capture media, the plurality of peripheral devices including a first peripheral device and a second peripheral device. In some examples, the electronic device is configured to present, via the display, the first peripheral device, the second peripheral device, and a plurality of user interface elements including a representation of a media stream, a selectable user interface element corresponding to the first peripheral device and a selectable user interface element corresponding to the second peripheral device. In some examples, while presenting the plurality of user interface elements, receive an input to initiate media capture, in response to the input to initiate media capture, the electronic device is configured to initiate the media capture by the plurality of peripheral devices, add a first respective stream of the media capture between a first time and a second time from the first peripheral device in a first state to the media stream, and display, via the display, a first visual indication corresponding to the first state of the first peripheral device. In some examples, after initiating the media capture, the electronic device is configured to receive an input selecting the selectable user interface element corresponding to the second peripheral device at the second time. In some examples, in response to the input selecting the selectable user interface element corresponding to the second peripheral the electronic device is configured to transition the first visual indication to correspond to a second state of the first peripheral device, display, via the display, a second visual indication corresponding to the first state of the second peripheral device, and add a second respective stream of the media capture between the second time and a third time from the second peripheral device in the first state to the media stream.

Additionally or alternatively, in some examples, the plurality of user interface elements further includes a first representation of the media capture from the first peripheral device different from the representation of the media stream.

Additionally or alternatively, in some examples, the first representation of the media capture is displayed at a first orientation relative to the electronic device, and the first peripheral device has a second orientation relative to the electronic device, wherein the second orientation is different from the first orientation.

Additionally or alternatively, in some examples, the first representation includes a visual indication of a level of audio captured by the first peripheral device.

Additionally or alternatively, in some examples, the representation of the media stream and the first representation of the media capture from the first peripheral device are displayed concurrently within a first user interface element.

Additionally or alternatively, in some examples, the electronic device is further configured to: in response to the input selecting the selectable user interface element corresponding to the second peripheral device, cease adding of the first respective stream to the media stream.

Additionally or alternatively, in some examples, the plurality of user interface elements further includes a second representation of the media captured from the second peripheral device.

Additionally or alternatively, in some examples, the plurality of user interfaces elements further includes a selectable user interface element configured to initiate the media capture. In some examples, the input to initiate media capture includes selection of the selectable user interface element configured to initiate the media capture.

Additionally or alternatively, in some examples, the plurality of user interface elements further includes a representation of a timeline of the media stream, wherein the timeline includes a representation of a transition between adding the first respective stream to adding the second respective stream to the representation of the media stream at the second time.

Additionally or alternatively, in some examples, the electronic device is further configured to: in response to transitioning a respective state of a respective peripheral device of the plurality of peripheral devices between the first state and the second state, generate time metadata associated with the transitioning of the respective state.

Additionally or alternatively, in some examples, the electronic device is further configured to while presenting the plurality of user interface elements, receive the time metadata associated with the transitioning of the respective state and present the media captured by the respective peripheral device using the time metadata indicating the respective peripheral device is in the first state.

Additionally or alternatively, in some examples, the electronic device is further configured to: while the media capture is ongoing, receive an input to terminate the media capture at a fourth time. In some examples, in response to the input to terminate the media capture, the electronic device is configured to terminate the media capture. In some examples, after terminating the media capture, the electronic device is further configured to receive an input to replay the media stream, and in response to the input to replay the media stream, present, via the display, a replay of the media stream using the representation of the media stream.

Additionally or alternatively, in some examples, the first peripheral device or the second peripheral device is configured to capture video.

Additionally or alternatively, in some examples, the first peripheral device or the second peripheral device is configured to capture audio.

Additionally or alternatively, in some examples, a first portion of the representation of the timeline corresponding to a first time period between the first time to the second time includes a first visual indication of the first peripheral device corresponding to the first respective stream, and wherein a second portion of the representation of the timeline corresponding to a second time period between the second time to the third time includes a second visual indication of the second peripheral device corresponding to the second respective stream.

Additionally or alternatively, in some examples, transitioning the first visual indication to correspond to the second state includes shrinking a representation of the media capture from the first peripheral device or the selectable user interface element corresponding to the first peripheral device, changing a color of the representation of the media capture from the first peripheral device or the selectable user interface element corresponding to the first peripheral device, ceasing presentation of the selectable user interface element corresponding to the first peripheral device or the representation of the media capture from the first peripheral device, or adding a border around the representation of the media capture from the first peripheral device or the selectable user interface element corresponding to the first peripheral device.

Additionally or alternatively, in some examples, the plurality of user interface elements further includes one or more user interface control elements corresponding to the first peripheral device, wherein input to the one or more user interface control elements modifies a characteristic of the media captured from the first peripheral device.

Additionally or alternatively, in some examples, the first peripheral device is configured to capture video and the plurality of user interface elements further includes a representation of a view frustrum of the first peripheral device, the electronic device is further configured to: in response to an input modifying the representation of the view frustrum, modifying the first respective stream in accordance with a modified position and orientation of the view frustrum.

Additionally or alternatively, in some examples, the electronic device is further configured to: receive an indication of one or more inputs from a respective peripheral device corresponding to a request to transition the respective peripheral device from the second state to the first state, and in response to receiving the indication of the request to transition the respective peripheral device from the second state to the first state, display, via the display, a third visual indication corresponding to the request, receive user input selecting the third visual indication, and in response to receiving the user input selecting the third visual indication, transitioning the respective peripheral device from the second state to the first state.

Additionally or alternatively, in some examples, the plurality of user interface elements further includes a selectable user interface element corresponding to a third peripheral device of the plurality of peripheral devices, and the electronic device is further configured to, while adding the first respective stream of the media capture from the first peripheral device in the first state: receive an input selecting the selectable user interface element corresponding to the third peripheral device; and in response to the input selecting the selectable user interface element corresponding to the third peripheral device, add a third respective stream of the media capture from the third peripheral device to the media stream at least partially concurrently with the first respective stream.

Additionally or alternatively, in some examples, the first respective stream of the media capture includes a virtual object at a location in a three-dimensional environment from a first respective viewpoint of the first peripheral device, and the second respective stream of the media capture includes the virtual object at the location in the three-dimensional environment from a second respective viewpoint of the second peripheral device.

Additionally or alternatively, in some examples, the electronic device is further configured to receive a representation of a three-dimensional environment from another device, wherein a real-world object is visible from a viewpoint of a user of the electronic device overlaid in the three-dimensional environment.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the invention and its practical applications, to thereby enable others skilled in the art to best use the invention and various described examples with various modifications as are suited to the particular use contemplated.

What is claimed is:

1. An electronic device in communication with a display and a plurality of peripheral devices configured to capture media, the plurality of peripheral devices including a first peripheral device and a second peripheral device, wherein the electronic device is configured to:
    present, via the display, the first peripheral device, the second peripheral device, and a plurality of user interface elements including a representation of a media stream, a selectable user interface element corresponding to the first peripheral device and a selectable user interface element corresponding to the second peripheral device;
    while presenting the plurality of user interface elements, receive an input to initiate media capture;
    in response to the input to initiate media capture:
        initiate the media capture by the plurality of peripheral devices;
        add a first respective stream of the media capture between a first time and a second time from the first peripheral device in a first state to the media stream;
        display, via the display, a first visual indication corresponding to the first state of the first peripheral device;
    after initiating the media capture, receive an input selecting the selectable user interface element corresponding to the second peripheral device at the second time; and
    in response to the input selecting the selectable user interface element corresponding to the second peripheral device:
        transition the first visual indication to correspond to a second state of the first peripheral device;
        display, via the display, a second visual indication corresponding to the first state of the second peripheral device;
        add a second respective stream of the media capture between the second time and a third time from the second peripheral device in the first state to the media stream.

2. The electronic device of claim 1, wherein the plurality of user interface elements further includes:
    a first representation of the media capture from the first peripheral device different from the representation of the media stream.

3. The electronic device of claim 2, wherein:
    the first representation of the media capture is displayed at a first orientation relative to the electronic device, and
    the first peripheral device has a second orientation relative to the electronic device, wherein the second orientation is different from the first orientation.

4. The electronic device of claim 2, wherein the first representation includes a visual indication of a level of audio captured by the first peripheral device.

5. The electronic device of claim 2, wherein the representation of the media stream and the first representation of the media capture from the first peripheral device are displayed concurrently within a first user interface element.

6. The electronic device of claim 1, further configured to:
    in response to the input selecting the selectable user interface element corresponding to the second peripheral device, cease adding of the first respective stream to the media stream.

7. The electronic device of claim 1, wherein the plurality of user interface elements further includes a second representation of the media captured from the second peripheral device.

8. The electronic device of claim 1, wherein the plurality of user interface elements further includes a selectable user interface element configured to initiate the media capture, and wherein the input to initiate media capture includes selection of the selectable user interface element configured to initiate the media capture.

9. The electronic device of claim 1, wherein the plurality of user interface elements further includes a representation of a timeline of the media stream, wherein the timeline includes a representation of a transition between adding the first respective stream to adding the second respective stream to the representation of the media stream at the second time.

10. The electronic device of claim 1, further configured to:
in response to transitioning a respective state of a respective peripheral device of the plurality of peripheral devices between the first state and the second state, generate time metadata associated with the transitioning of the respective state.

11. The electronic device of claim 10, further configured to:
while presenting the plurality of user interface elements, receive the time metadata associated with the transitioning of the respective state; and
present the media captured by the respective peripheral device using the time metadata indicating the respective peripheral device is in the first state.

12. The electronic device of claim 1, the electronic device further configured to:
while the media capture is ongoing, receive an input to terminate the media capture at a fourth time;
in response to the input to terminate the media capture, terminate the media capture;
after terminating the media capture, receive an input to replay the media stream; and
in response to the input to replay the media stream, present, via the display, a replay of the media stream using the representation of the media stream.

13. The electronic device of claim 1, wherein the first peripheral device or the second peripheral device is configured to capture video.

14. The electronic device of claim 1, wherein the first peripheral device or the second peripheral device is configured to capture audio.

15. The electronic device of claim 9, wherein a first portion of the representation of the timeline corresponding to a first time period between the first time to the second time includes a first visual indication of the first peripheral device corresponding to the first respective stream, and wherein a second portion of the representation of the timeline corresponding to a second time period between the second time to the third time includes a second visual indication of the second peripheral device corresponding to the second respective stream.

16. The electronic device of claim 1, wherein transitioning the first visual indication to correspond to the second state includes:
shrinking a representation of the media capture from the first peripheral device or the selectable user interface element corresponding to the first peripheral device;
changing a color of the representation of the media capture from the first peripheral device or the selectable user interface element corresponding to the first peripheral device;
ceasing presentation of the selectable user interface element corresponding to the first peripheral device or the representation of the media capture from the first peripheral device; or
adding a border around the representation of the media capture from the first peripheral device or the selectable user interface element corresponding to the first peripheral device.

17. The electronic device of claim 1, wherein the plurality of user interface elements further includes one or more user interface control elements corresponding to the first peripheral device, wherein input to the one or more user interface control elements modifies a characteristic of the media captured from the first peripheral device.

18. The electronic device of claim 1, wherein the first peripheral device is configured to capture video and the plurality of user interface elements further includes a representation of a view frustrum of the first peripheral device, the electronic device further configured to:
in response to an input modifying the representation of the view frustrum, modifying the first respective stream in accordance with a modified position and orientation of the view frustrum.

19. The electronic device of claim 1, further configured to:
receive an indication of one or more inputs from a respective peripheral device corresponding to a request to transition the respective peripheral device from the second state to the first state; and
in response to receiving the indication of the request to transition the respective peripheral device from the second state to the first state, display, via the display, a third visual indication corresponding to the request;
receive user input selecting the third visual indication; and
in response to receiving the user input selecting the third visual indication, transitioning the respective peripheral device from the second state to the first state.

20. The electronic device of claim 1, wherein the plurality of user interface elements further includes a selectable user interface element corresponding to a third peripheral device of the plurality of peripheral devices, and the electronic device is further configured to, while adding the first respective stream of the media capture from the first peripheral device in the first state:
receive an input selecting the selectable user interface element corresponding to the third peripheral device; and
in response to the input selecting the selectable user interface element corresponding to the third peripheral device, add a third respective stream of the media capture from the third peripheral device to the media stream at least partially concurrently with the first respective stream.

21. The electronic device of claim 1, wherein the first respective stream of the media capture includes a virtual object at a location in a three-dimensional environment from a first respective viewpoint of the first peripheral device, and the second respective stream of the media capture includes the virtual object at the location in the three-dimensional environment from a second respective viewpoint of the second peripheral device.

22. The electronic device of claim 1, further configured to receive a representation of a three-dimensional environment from another device, wherein a real-world object is visible overlaid in the representation of the three-dimensional environment from a viewpoint of a user of the electronic device.

23. A method comprising:
at an electronic device in communication with a display and a plurality of peripheral devices configured to capture media, the plurality of peripheral devices including a first peripheral device and a second peripheral device:
presenting, via the display, the first peripheral device, the second peripheral device, and a plurality of user interface elements including a representation of a media stream, a selectable user interface element corresponding to the first peripheral device and a selectable user interface element corresponding to the second peripheral device;

while presenting the plurality of user interface elements, receive an input to initiate media capture;
in response to the input to initiate media capture:
  initiating the media capture by the plurality of peripheral devices;
  adding a first respective stream of the media capture between a first time and a second time from the first peripheral device in a first state to the media stream;
  displaying, via the display, a first visual indication corresponding to the first state of the first peripheral device;
after initiating the media capture, receiving an input selecting the selectable user interface element corresponding to the second peripheral device at the second time; and
in response to the input selecting the selectable user interface element corresponding to the second peripheral device:
  transitioning the first visual indication to correspond to a second state of the first peripheral device;
  displaying, via the display, a second visual indication corresponding to the first state of the second peripheral device; and
  adding a second respective stream of the media capture between the second time and a third time from the second peripheral device in the first state to the media stream.

24. A non-transitory computer readable medium storing one or more programs, the one or more programs comprising instructions, which when executed by one or more processors of an electronic device in communication with a display and a plurality of peripheral devices configured to capture media, the plurality of peripheral devices including a first peripheral device and a second peripheral device, cause the electronic device to:
present, via the display, the first peripheral device, the second peripheral device, and a plurality of user interface elements including a representation of a media stream, a selectable user interface element corresponding to the first peripheral device and a selectable user interface element corresponding to the second peripheral device;
while presenting the plurality of user interface elements, receive an input to initiate media capture;
in response to the input to initiate media capture:
  initiate the media capture by the plurality of peripheral devices;
  add a first respective stream of the media capture between a first time and a second time from the first peripheral device in a first state to the media stream;
  display, via the display, a first visual indication corresponding to the first state of the first peripheral device;
after initiating the media capture, receive an input selecting the selectable user interface element corresponding to the second peripheral device at the second time; and
in response to the input selecting the selectable user interface element corresponding to the second peripheral device:
  transition the first visual indication to correspond to a second state of the first peripheral device;
  display, via the display, a second visual indication corresponding to the first state of the second peripheral device; and
  add a second respective stream of the media capture between the second time and a third time from the second peripheral device in the first state to the media stream.

\* \* \* \* \*